(12) United States Patent
Wurster

(10) Patent No.: US 9,489,524 B2
(45) Date of Patent: Nov. 8, 2016

(54) INTRA-APPLICATION PERMISSIONS ON AN ELECTRONIC DEVICE

(71) Applicant: BlackBerry Limited, Waterloo (CA)

(72) Inventor: Glenn Daniel Wurster, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/286,798

(22) Filed: May 23, 2014

(65) Prior Publication Data

US 2015/0339482 A1 Nov. 26, 2015

(51) Int. Cl.
| | |
|---|---|
| G06F 21/00 | (2013.01) |
| G06F 21/62 | (2013.01) |
| G06F 21/44 | (2013.01) |
| G06F 21/51 | (2013.01) |
| G06F 21/52 | (2013.01) |
| H04L 29/06 | (2006.01) |
| H04W 12/08 | (2009.01) |

(52) U.S. Cl.
CPC ............... *G06F 21/62* (2013.01); *G06F 21/44* (2013.01); *G06F 21/51* (2013.01); *G06F 21/52* (2013.01); *H04L 63/10* (2013.01); *H04W 12/08* (2013.01)

(58) Field of Classification Search
CPC ................................ H04L 63/101; G06F 8/61
See application file for complete search history.

(56) References Cited

U.S. PATENT DOCUMENTS

| | | | | |
|---|---|---|---|---|
| 8,255,991 | B1* | 8/2012 | Hackborn et al. | ............... 726/21 |
| 2002/0163544 | A1* | 11/2002 | Baker et al. | .................. 345/835 |
| 2003/0126131 | A1* | 7/2003 | Cihula | .................. H04L 9/3263 |
| 2004/0127190 | A1* | 7/2004 | Hansson | .................. G06F 9/468 |
| | | | | 455/403 |
| 2006/0265591 | A1* | 11/2006 | Torrubia | .................. G06F 21/10 |
| | | | | 713/176 |
| 2008/0244685 | A1* | 10/2008 | Andersson et al. | ............... 726/1 |
| 2010/0005280 | A1* | 1/2010 | Wagner | ............... G06F 21/6209 |
| | | | | 713/1 |
| 2010/0274910 | A1 | 10/2010 | Ghanaie-Sichanie et al. | |
| 2011/0191590 | A1* | 8/2011 | Darbellay | ............. G06F 21/645 |
| | | | | 713/175 |
| 2012/0209923 | A1* | 8/2012 | Mathur et al. | ................. 709/206 |
| 2012/0240236 | A1* | 9/2012 | Wyatt et al. | .................... 726/25 |
| 2012/0284702 | A1* | 11/2012 | Ganapathy et al. | .......... 717/174 |
| 2013/0091542 | A1* | 4/2013 | Cohen | ............................... 726/1 |

(Continued)

OTHER PUBLICATIONS

"AccessControlIntroduction", seek-for-android Secure Element Evaluation Kit for the Android platform—the 'SmartCard API'; https://code.google.com/p/seek-for-android/wiki/AccessControlIntroduction (Obtained from the internet May 23, 2014), Jul. 6, 2012, 5 pages.

(Continued)

*Primary Examiner* — Morshed Mehedi
(74) *Attorney, Agent, or Firm* — Conley Rose, P.C.; J. Robert Brown, Jr.

(57) ABSTRACT

Various embodiments are provided in which intra-application permissions may be granted on an electronic device. An application may access data from another application if the application has the proper permission signed by a permissions server. In one embodiment, a request is received by a first application that is installed on a device. The request is from a second application for permission to access data associated with the first application. A permissions record for the second application may be stored in an application package of the second application. The first application may access the permissions record to determine whether the second application has permission to access the data associated with the first application. The first application may provide the second application with access to the data associated with the first application based, at least in part, on the permissions record stored in the application package of the second application.

19 Claims, 8 Drawing Sheets

(56) References Cited

U.S. PATENT DOCUMENTS

| | | | |
|---|---|---|---|
| 2013/0160147 A1* | 6/2013 | Draluk et al. | 726/30 |
| 2013/0305006 A1* | 11/2013 | Altman et al. | 711/163 |
| 2014/0032904 A1* | 1/2014 | Margalit | 713/168 |
| 2015/0033320 A1* | 1/2015 | Liang | 726/11 |
| 2015/0121478 A1* | 4/2015 | Huang et al. | 726/4 |

OTHER PUBLICATIONS

"ARA_diagram_png", seek-for-android Secure Element Evaluation Kit for the Android platform—the 'SmartCard API'; https://code.google.com/p/seek-for-android/wiki/ARA_diagram (Obtained from the internet May 23, 2014), Jul. 6, 2012, 2 pages.

"Signing Your Applications", http://www.linuxtopia.org/online_books/android/devguide/guide/publishing/app-signing.html (Obtained from the Internet May 21, 2014), 7 pages.

Van Oorschot, Paul C.; "Reducing Unauthorized Modication of Digital Objects"; IEEE; Jan. 6, 2011; 15 pages.

European Extended Search Report; Application No. 15168944.5; Sep. 24, 2015; 7 pages.

Dngtang, Machigar, et al.; "Semantically Rich Application-Centric Security in Android"; Computer Security Applications Conference; Dec. 7, 2009; 10 pages.

Ma, Zhongmin; "Android Application Install-time Permission Validation and Run-time Malicious Pattern Detection"; Arlington, Virginia; Nov. 4, 2013; 66 pages.

Sbirlea, Dragos, et al.; "Automatic Detection of Inter-application Permission Leaks in Android Applications"; Technical Report TR13-02; Department of Computer Science; Rice University; Jan. 2013; 20 pages.

Elenkov, Nikolay; "Code Signing in Android's Security Model"; http://nelenkov.blogspot.com/2013/05/code-signing-in-androids-security-model.html; May 2, 2013; 14 pages.

* cited by examiner

PERMISSIONS
RECORD
500

| 502 | PERMISSION TO ACCESS DATA X OF INSTALLED APPLICATION A |
| 504 | PERMISSION TO ACCESS DATA Y OF INSTALLED APPLICATION B |
| | ○ ○ ○ |
| 506 | PERMISSION TO ACCESS DATA Z OF INSTALLED APPLICATION N |
| 508 | DIGITAL CERTIFICATE OF CANDIDATE APPLICATION |
| 510 | PERMISSIONS AUTHORITY DIGITAL SIGNATURE |

FIG. 5

INTRA-APPLICATION PERMISSIONS ON AN ELECTRONIC DEVICE

BACKGROUND

Embodiments of the subject matter generally relate to the field of electronic devices, and, more particularly, to intra-application permissions on electronic devices.

Electronic devices (such as mobile devices, smartphones, tablet computers, etc.) can be configured to allow different types of applications to execute thereon. The applications can be pre-installed or downloaded, for example, over a network. For example, the applications can be downloaded from an application distribution platform that may be integrated with an operating system of the electronic device. These applications are typically tailored to the screen size and the hardware for the particular electronic device.

As part of an installation of an application, an electronic device may present to a user a list of permissions that the user must authorize so that the application can be installed and operate on the electronic device. The application distribution platform may be designed such that all permissions associated with an application must be accepted prior to installation of the application. These permissions can include authorizations to allow the application to access data on the electronic device. For example, some applications need permissions to access the phone logs, contacts, calendar information, information about the device's current location and location history, device identifiers or other information uniquely identifying the device, etc. A group of applications may be associated with permissions for sharing data among applications in the group of applications. However, for such a permission, the group of applications must be associated with a common application provider certificate, and the group of applications may be unable to limit the types of data shared between applications associated with the common application provider certificate.

BRIEF DESCRIPTION OF THE DRAWINGS

The present embodiments may be better understood by referencing the accompanying drawings.

FIG. 5 depicts an example permissions record that includes a list of permissions needed to access protected data in a first application on a device, according to some embodiments.

DESCRIPTION OF EMBODIMENT(S)

Figure 1:
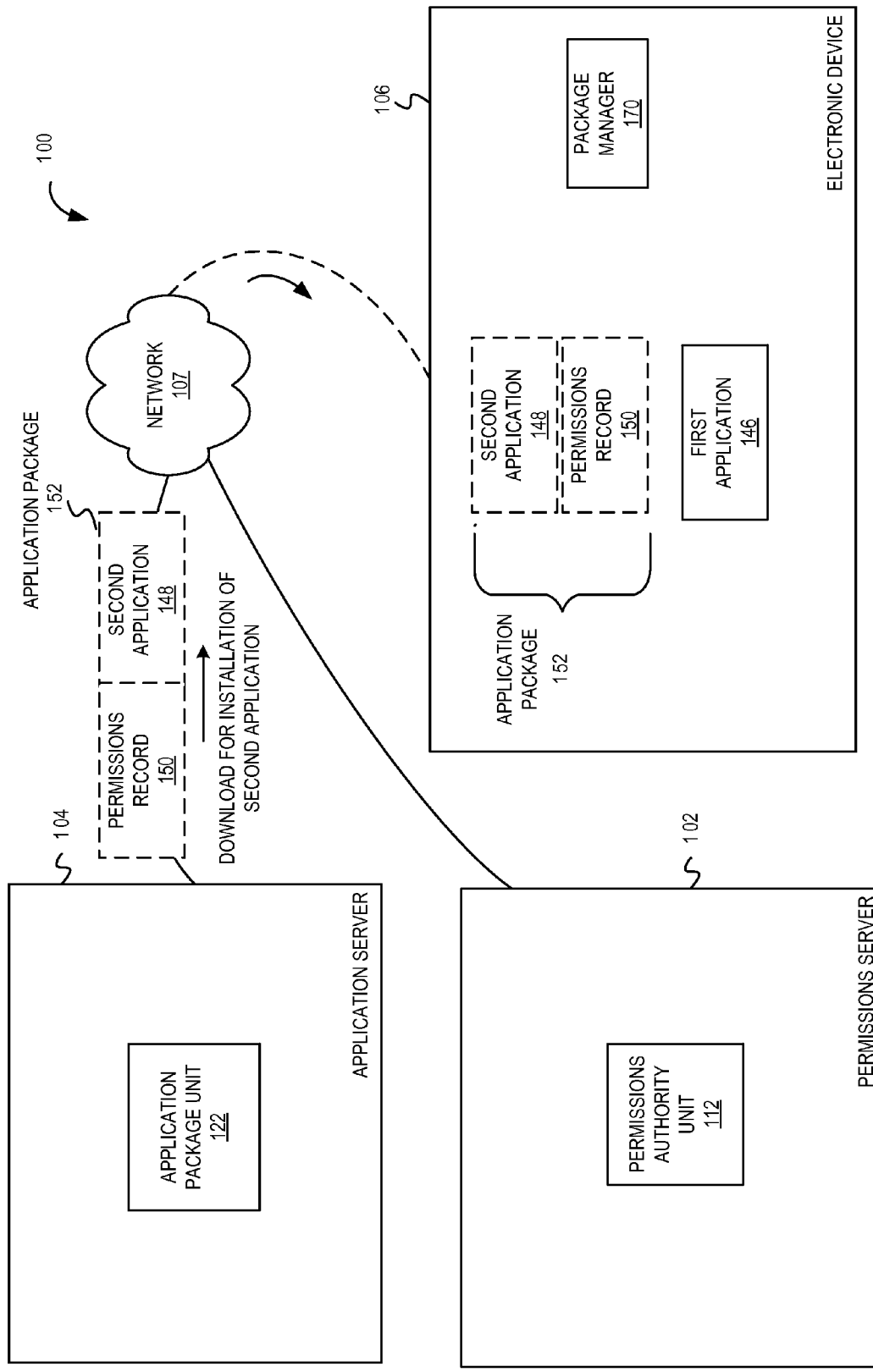
FIGS. 1-2 are conceptual diagrams of an example system for authorizing of an intra-application permission on a device at different points in time, according to some embodiments.

The description that follows includes example systems, methods, techniques, instruction sequences and computer program products that embody techniques of the present subject matter. However, it is understood that the described embodiments may be practiced without these specific details. For instance, although examples refer to authorizing permissions as part of installation of an application, some embodiments for authorize permissions to applications that are already installed on the device. In other instances, well-known instruction instances, protocols, structures and techniques have not been shown in detail in order not to obfuscate the description.

Various embodiments are provided in which intra-application permissions may be granted on an electronic device. An application may access data from another application if the application has the proper permission signed by a permissions server. The permissions may be granted on a per-application basis and may not be associated with a common application provider certificate. Permissions or restrictions may be granular based on the types of data that can be accessed between the applications. Permissions or restrictions as described according to some embodiments may not depend on a current underlying permission or restriction system present on the electronic device.

In one embodiment, a request is received by a first application that is installed on a device. The request is from a second application for permission to access data associated with the first application. In some embodiments, a permissions record for the second application may, for example, be stored in an application package of the second application. The first application may access the permissions record to determine whether the second application has permission to access the data associated with the first application. The first application may provide the second application with access to the data associated with the first application based, at least in part, on the permissions record stored in the application package of the second application.

Some embodiments are used during installation of an application (e.g., a candidate application) that is being installed on an electronic device. As part of the installation, the candidate application may request permission from another application already installed on the electronic device (e.g., an installed application) to access data controlled by the installed application. Thus, a permission of a second application (e.g., a candidate application) can be defined as an authorization needed by a first application (e.g., an installed application) to access data that is controlled by the first application. In some embodiments, the permission of the candidate application needs to be vetted by the installed application prior to allowing the candidate application to be installed and operational on an electronic device.

Therefore, there can be two applications that are part of a process for requesting permission. A second application (e.g., candidate application) may be an application that has not yet been installed on the electronic device but is a candidate for installation depending on whether its permissions are authorized. The first application (e.g., installed application) is the application from which permission is being requested. There can be one to any number of permissions that need to be authorized prior to installation of the candidate application. Accordingly, more than one installed application may need to vet permissions for the candidate application. For example, in some instances there can be a one-to-one relationship between the number of permissions required and the number of installed applications whose authorization is needed. In other examples, there may be more than one permission required from one or more installed applications by a candidate application.

While described such that operations for authorizing a permissions request is related to installation of a candidate application, in some embodiments, these operations can be used to authorize a permission for an application that is already installed. For example, an application already installed on an electronic device can be upgraded or expanded through code or data downloaded at run-time from a remote source. The upgrade can include one or more new permissions. Thus, the upgraded application can also include an updated permissions record having one or more new permissions that need to be authorized by other installed applications. Also, the second application can download a new permissions record from a remote server at runtime. In some embodiments, the second application could send the permissions request to the first application on an on-demand basis. For example, the candidate application may request the permission(s) the first time the application is executed on the device. In other examples, the first time a certain type of data is required by the candidate application, a request for permission may at that time be requested from the first (installed) application. Accordingly, the operations described herein can be used to authorize the one or more new permissions in an updated permissions record for an application that is already installed.

In some embodiments, the candidate application may need to access data from the installed application in order to function as intended on the device. In some embodiments, the permission is not obtained from the installed application, the candidate application may, for example, not be installed on the device, may be uninstalled from the device, may be prevented from operating on the device, or may not function as intended. In some embodiments, if the permission is requested as part of an update to an application which has already been installed, as described above, the update may, for example, be declined or cancelled, the application may be uninstalled, may be prevented from operating, or may not function as intended. In some embodiments, once the permission to access data in the installed program is granted to the candidate program, the candidate program can access the permitted data during operation without requesting further permissions.

Figure 2:
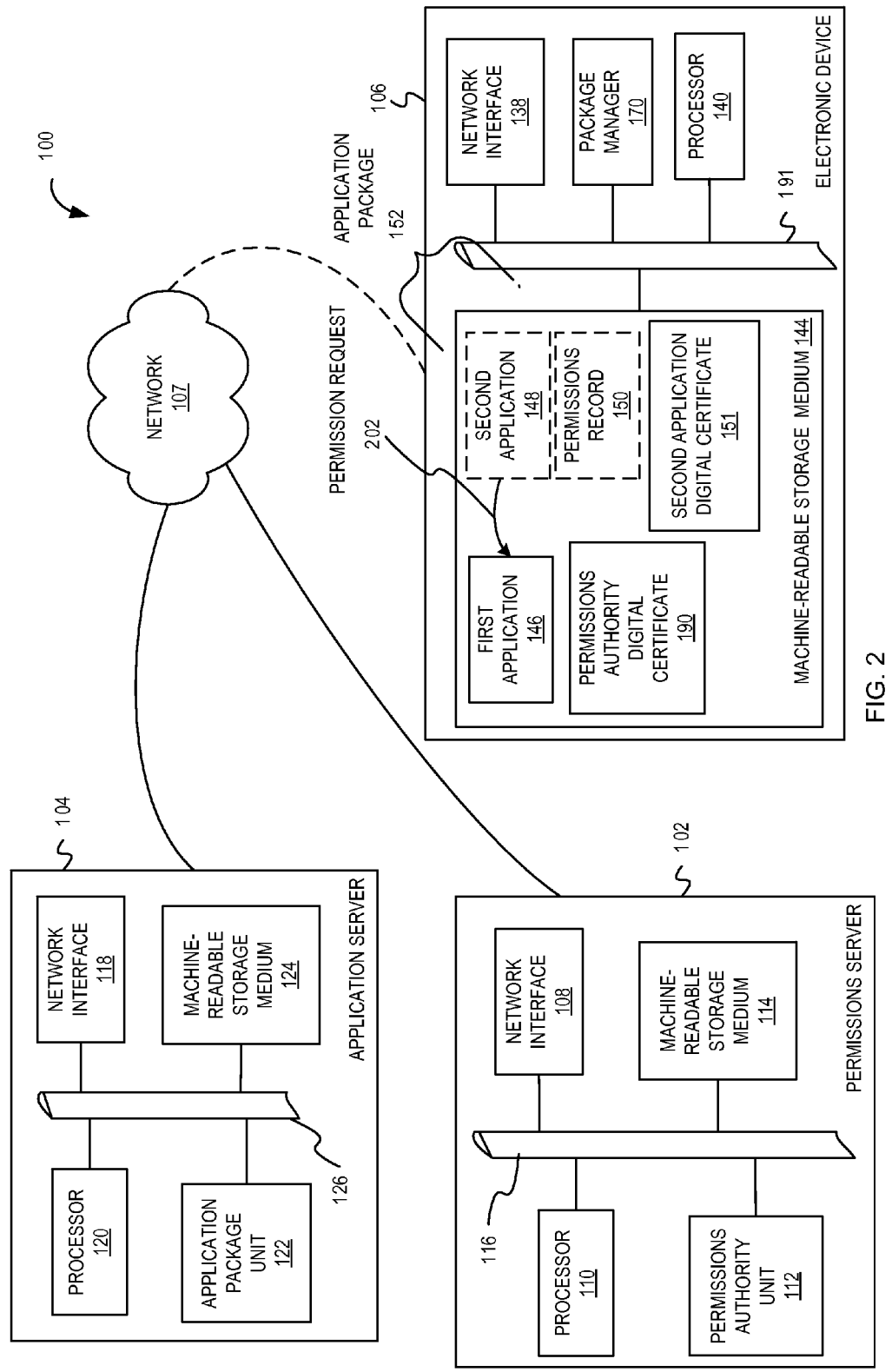

FIGS. 1-2 are conceptual diagrams of an example system for authorizing of an intra-application permission on a device at different points in time, according to some embodiments. In particular, FIGS. 1-2 depict a system 100 that illustrates operations for downloading a second application (e.g., candidate application) to be installed on an electronic device. Prior to installation of the second application, a first application (e.g., an installed application) can determine whether to authorize permission to enable the second application to access data controlled by the first application. There can be a number of scenarios in which a first application controls data, wherein a second application requests access to such data. For example, the first application can be an identity service which allows for single sign-on for logging into account(s). The first application can control data that includes identity credentials for the account(s). The second application can request permission to access the identity credentials for its operations. In another example, the data that is to be accessed can be internal Application Programming Interfaces (APIs) for accessing certain content on the device. The first application can control access to these internal APIs and can limit access to those applications that are being developed specifically to access this certain content. While FIGS. 1-2 depict only one application that can determine whether to authorize access to data by a second application, some applications may request permission from any number of installed applications.

FIG. 1 depicts the system 100 at a first point in time during a download of a second application for installation on an electronic device. The system 100 includes a permissions server 102, an application server 104, and an electronic device 106. The permissions server 102, the application server 104, and the electronic device 106 are communicatively coupled together through a network 107. In some embodiments, the electronic device 106 can be a mobile device that is wirelessly coupled to the network 107.

The permissions server 102 includes a permissions authority unit 112. The permission authority unit 112 can be software, hardware, firmware, or a combination thereof. For example, the permissions authority unit 112 can be software executing on a processor of the permissions server. The permissions authority unit 112 can create permissions records for applications that are to be installed and executed on electronic devices. The permissions records for a second application can include a number of entries. Each entry can include an identification of a first application from which a permission is needed. The permission may be an authorization to access data by the second application that is controlled by the first application. The permissions may be used by the second application to execute after its installation on an electronic device. The permissions record can also include one or more digital certificates used to digitally sign the second application. Accordingly, the permissions authority unit 112 can be a centralized entity that can determine which permissions should be authorized between different applications executing on electronic devices. The permissions authority unit 112 can also digitally sign a permissions record to authenticate the permissions record. As further described below, a permissions record for a second application can, for example, be stored along with the second application as part of an application package that can be downloaded to electronic devices for installation. In some embodiments, there can be multiple permissions authorities. For example, application A may recognize permissions authority X as a recognized permissions authority, while application B may recognize permissions authority Y as a recognized permissions authority. Accordingly, different applications can use different permissions authorities to authorize their permissions.

The application server 104 includes an application package unit 122. The application package unit 122 can be software, hardware, firmware, or a combination thereof. For example, the application package unit 122 can be software executing on a processor. The application server 104 can also include a machine-readable storage medium for storage of different application packages that can be downloaded to electronic devices. In this example, the application package unit 122 downloads an application package 152 to the electronic device 106 over the network 107. For example, a process on the electronic device 106 can download an application package, thereby causing the application package unit 122 to transmit the application package to the electronic device 106 over the network 107. In some embodiments, the application package 152 is not downloaded from the application server 104. For example, the application package 152 can be emailed to the electronic device 106. Also, the application package 152 can be loaded from a device that is coupled to the electronic device 106. For example, the application package 152 can be loaded from a Universal Serial Bus (USB) device that is connected to a port on the electronic device 106. The application package 152 includes a second application 148 and a permissions record 150. The application package 152 can also include an installation file associated with the second application. The installation file can be stored by an application installer of the electronic device 106. When the second application 148 is installed on the electronic device 106, the application package 152 can be stored on the electronic device 106. The application package 152 can remain stored on the electronic device 106 after the second application 148 is installed and is operational.

In some embodiments, the permissions authority unit 112 digitally signs the permissions record 150. In some embodiments, a developer can create the second application 148. The developer can also create the permissions record 150 that has not yet been digitally signed by the permissions authority unit 112. The developer can then transmit the permissions record 150 to the permissions server 104 using a device that is coupled to the network 107. The permissions authority unit 112 can validate the content of the permissions record 150. Validation can include whether the defined permissions in the permissions record 150 for access of data between applications can be authorized. If the content is validated, the permissions authority unit 112 can digitally sign the permissions record 150 and return digital signature of the permissions record 150 to the developer. The developer can then embed the digital signature of the permissions record 150 and the permissions record 150 into the application package 152. The developer can then sign the application package 152 and upload the application package 152 to the application server 104. Subsequently, the electronic device 106 obtains a copy of the application package 152 and installed the second application 148. After being installed, the second application 148 can then request data from the first application 146. The second application 148 can provide the signed permissions record 150 as proof of authorization to the first application (as further described below). Thus, the permissions record 150 includes a list of permissions that may be needed from other installed applications on the electronic device 106.

The electronic device 106 includes a package manager 170 and a first application 146. The package manager 170 can be software, hardware, firmware, or a combination thereof. For example, the package manager 170 can be software executing on a processor of the electronic device 106. As shown by the dashed lines, the electronic device 106 may be in the process of storing the application package 152 that includes the second application 148 and the permissions record 150. An example of a permissions record is depicted in FIG. 5, which is described in more detail below.

The first application 146 can be software that executes on a processor. For example, the first application 146 can be an application that was pre-loaded on the electronic device 106 or was previously downloaded and installed in the electronic device (e.g., after its permissions in its permissions record were authorized by other already installed applications).

As further described below, the first application 146 can use a permissions authority digital certificate to authenticate a digital signature of the permissions authority unit 112 that is appended to the permissions record 150. Also, the first application 146 can retrieve a copy of the digital certificate used to authenticate the second application 148 from the package manager 170. In particular, the package manager 170 can have or retrieve the digital certificates of applications.

The permissions server 102 may not need to be continually connected to the network 107. For example, the permissions server 102 can be offline while signing the permissions record 150. Also, the permissions server 102 can be offline at the time of the verification by the first application 146 regarding access of data by the second application 148.

In some embodiments, the permissions authority digital signature can be stored in the electronic device 106, thereby not requiring the permissions server 102 to be online at the time of the verification of the permissions record 150. For example, the permissions authority digital certificate can be embedded in the first application 146.

FIG. 2 depicts the example system for authorizing of an intra-application permission on a device at a second point in time, according to some embodiments. In particular, FIG. 2 depicts the system 100 of FIG. 1 after the application package 152 (including the second application 148 and the permissions record 150) has been downloaded into the electronic device 106 but prior to its installation. Also, FIG. 2 depicts a more detailed view of the system 100 that includes additional components to further illustrate some embodiments.

The permissions server 102 includes a network interface 108, a processor 110, the permissions authority unit 112, and a machine-readable storage medium 114 that are communicatively coupled together through a bus 116. The machine-readable storage medium 114 can be a volatile or non-volatile medium for storage of data. The network interface 108 can be software, hardware, firmware, or a combination thereof used for communication over the network 107.

The application server 104 includes a network interface 118, a processor 120, the application package unit 122, and a machine-readable storage medium 124 that are communicatively coupled together through a bus 126. The network interface 118 can be software, hardware, firmware, or a combination thereof used for communication over the network 107.

The electronic device 106 includes a network interface 138, a processor 140, the package manager 170, and a machine-readable storage medium 144 that are communicatively coupled together through a bus 191. The network interface 138 can be software, hardware, firmware, or a combination thereof used for communication over the network 107. The machine-readable storage medium 144 can be a volatile or non-volatile medium for storage of data. In this example, the machine-readable storage medium 144 is configured to store the first application 146, a permissions authority digital certificate 190, and a second application digital certificate 151. The machine-readable storage medium 144 is configured to store the application package 152 that includes the second application 148 and the permissions record 150. In this example as shown by the dashed lines, the second application 148 is not yet installed.

As part of the first application 146 granting access to the second application 148, either during or after install of either the first application 146 or the second 148 application, the first application 146 obtains the permissions record 150 before authorizing the second application 148 to access data controlled by the first application 146. The second application 148 can make a permission request 202 to the first application 146. The first application 146 can then determine whether to authorize permission. The operations of the permission authorization by the first application 146 are described in reference to the flow charts depicted in FIGS. 6-7 (which are described in more detail below).

Figure 3:
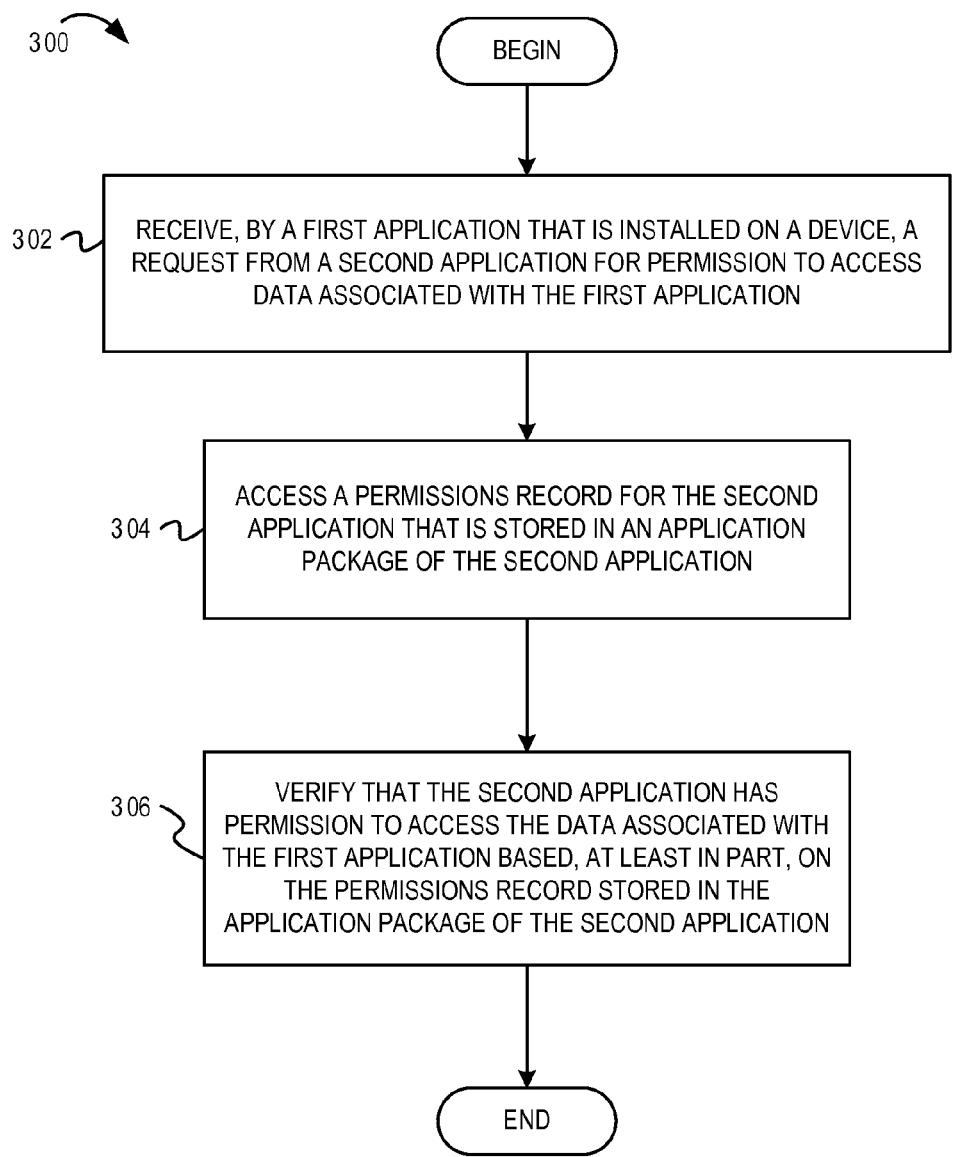
FIG. 3 depicts a flowchart of operations to authorize an intra-application permission on a device, according to some embodiments.

FIG. 3 depicts a flowchart of operations to authorize an intra-application permission on a device, according to some embodiments. FIG. 3 depicts a flowchart 300. The operations depicted in the flowchart 300 are described in reference to the system 100 depicted in FIGS. 1-2. Operations of the flowchart 300 start at block 302.

At block 302, a request is received, by a first application that is installed on a device. The request is from a second application and is for permission to access data associated with the first application. For example, the second application can be a candidate application that is attempting to be installed on the device. The request can be for a permission to access data by the candidate application after installation of the candidate application on the device. In some embodiments, this request can be received in response to downloading the candidate application for installation on the device. With reference to FIG. 2, the second application 148 can access the permission record 150 that lists the permissions needed to be authorized in order for the second application 148 to be installed and execute on the electronic device 106. In this example, the second application 148 determines there is one permission that needs to be authorized prior to its installation. The permission needs to be authorized by the first application 146. The second application 148 transmits a permissions request 202 to the first application 146. In some embodiments, the second application can already be installed on the device. For example, the permissions request can be received if an update is received for a permissions record of an application that is already installed on the device. Operations of the flowchart 300 continue at block 304.

At block 304, a permissions record for the second application is accessed. In some embodiments, the permissions record can be accessed from the application package for the second application. With reference to FIG. 2, the first application 146 can access the permissions record 150 for the second application 148. The first application 146 can obtain the permissions record 150 from the second application 148. Alternatively, the first application 146 can retrieve the permissions record 150 that is still within the application package 152 stored in the machine-readable storage medium 144. The first application 146 can access the permissions record 150 using a file system path associated with the application package 152. Accordingly, the first application 146 can access the application package 152 for the second application 148 at runtime when the second application 148 attempts to access data from the first application 146. In some embodiments, the first application 146 can access the permissions record 150 for the second application 148 from a source other than the application package 152. For example, the first application 148 can retrieve the permissions record from a server over the network 107 at runtime, in response to the permissions request from the second application 148. Operations of the flowchart 300 continue at block 306.

Figure 6:
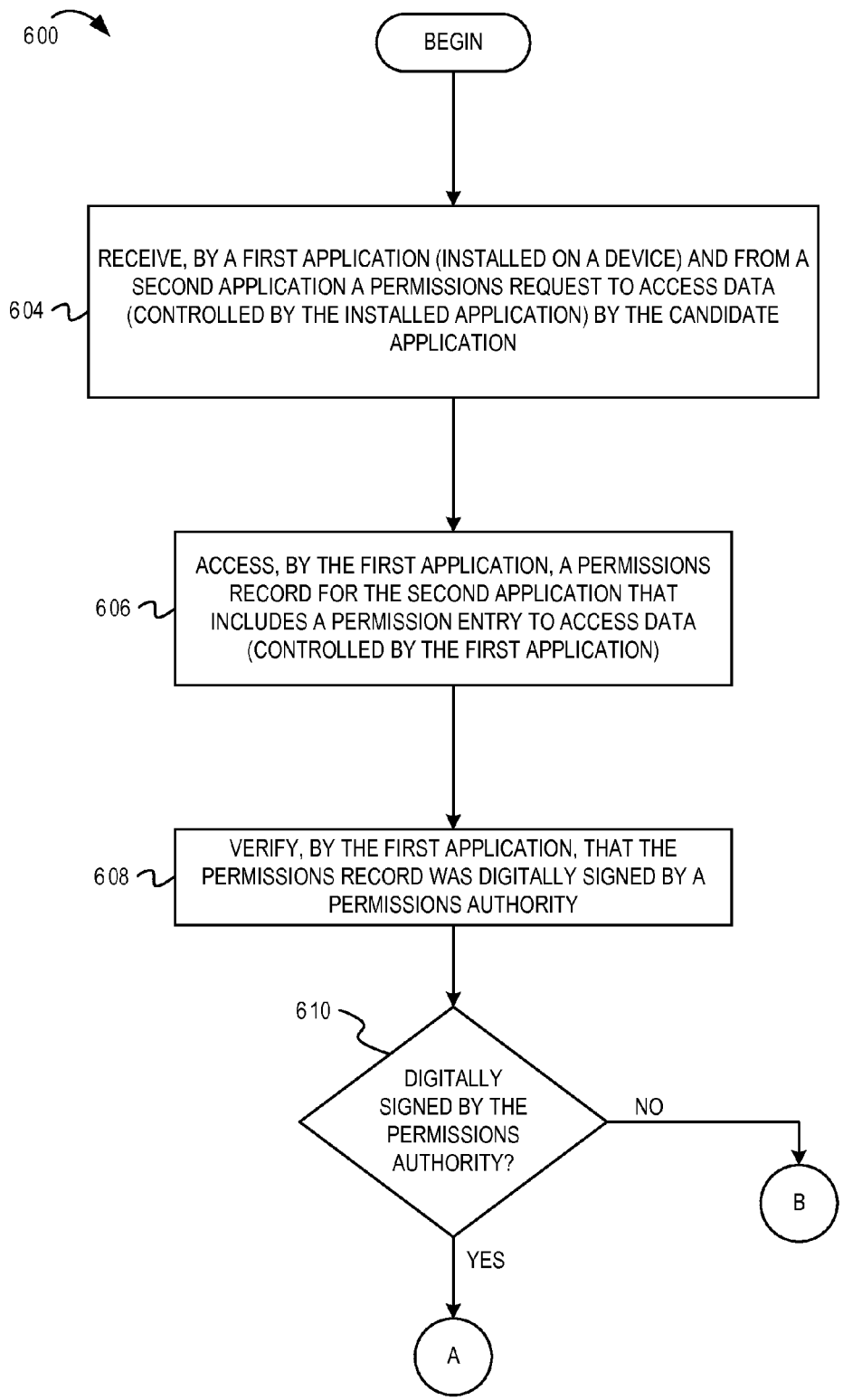
FIGS. 6-7 depict flowcharts of operations to authorize an intra-application permission on a device, according to some other embodiments.
Figure 7:
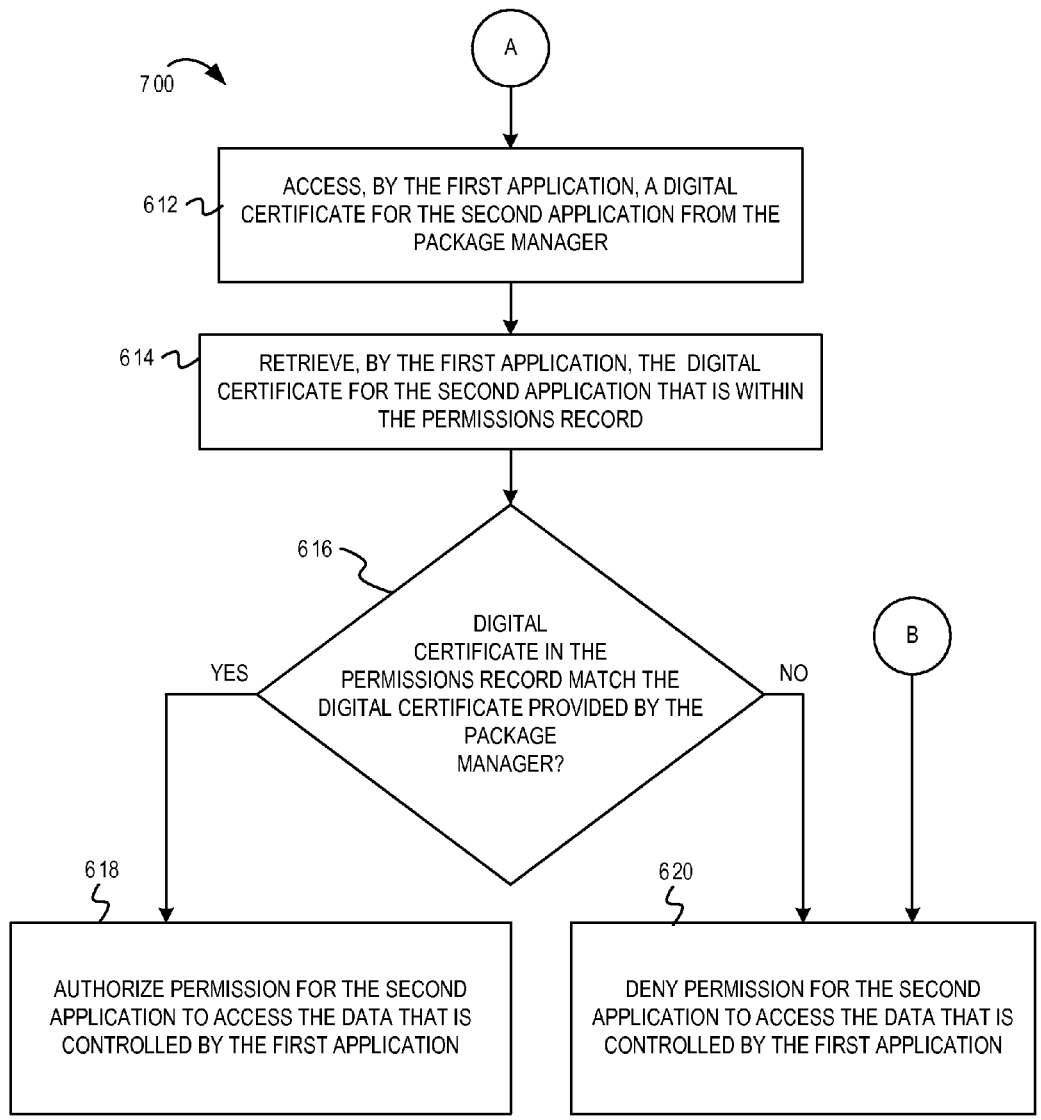

At block 306, there is verification that the second application has permission to access the data associated with the first application based, at least in part, on the permissions record stored in the application package of the second application. For example with reference to FIG. 2, the second application is the second application 148. In one embodiment, a second application digital certificate stored in the permissions record 150 is verified. In some embodiments the second application digital certificate stored in the permissions record 150 can be verified by determining whether the second application digital certificate stored in the permissions record matches a different copy of the second application digital certificate from a trusted source. For example with reference to FIG. 2, the trusted source can be the package manager 170. Thus, the first application 146 (the first application) can determine if the second application digital certificate 151 used to authenticate the second application 148 (provided by the package manager 170) matches the second application digital certificate stored in the permissions record 150. If the two second application digital certificates match, the second application digital certificate stored in the permissions record is validated. In some embodiments, the first application 146 can determine if the two second application digital certificates match by performing a bit-wise comparison of the bits of the two second application digital certificates. If verified, the first application 146 can authorize permission. If not verified, the first application 146 can deny permission. Once the different permissions in the permissions record 150 are verified, the second application 148 can be permitted to access the data in the first application protected by the permission. In this example of the flowchart 300, only the second application digital certificate stored in the permissions record is validated prior to authorizing permissions. In some other embodiments, a permissions authority digital signature that can be appended to the permissions record 150 can also be validated prior to authorizing permission. An example of such operations is depicted in FIGS. 6-7, which are described in more detail below. Operations of the flowchart 300 are complete.

Figure 4:
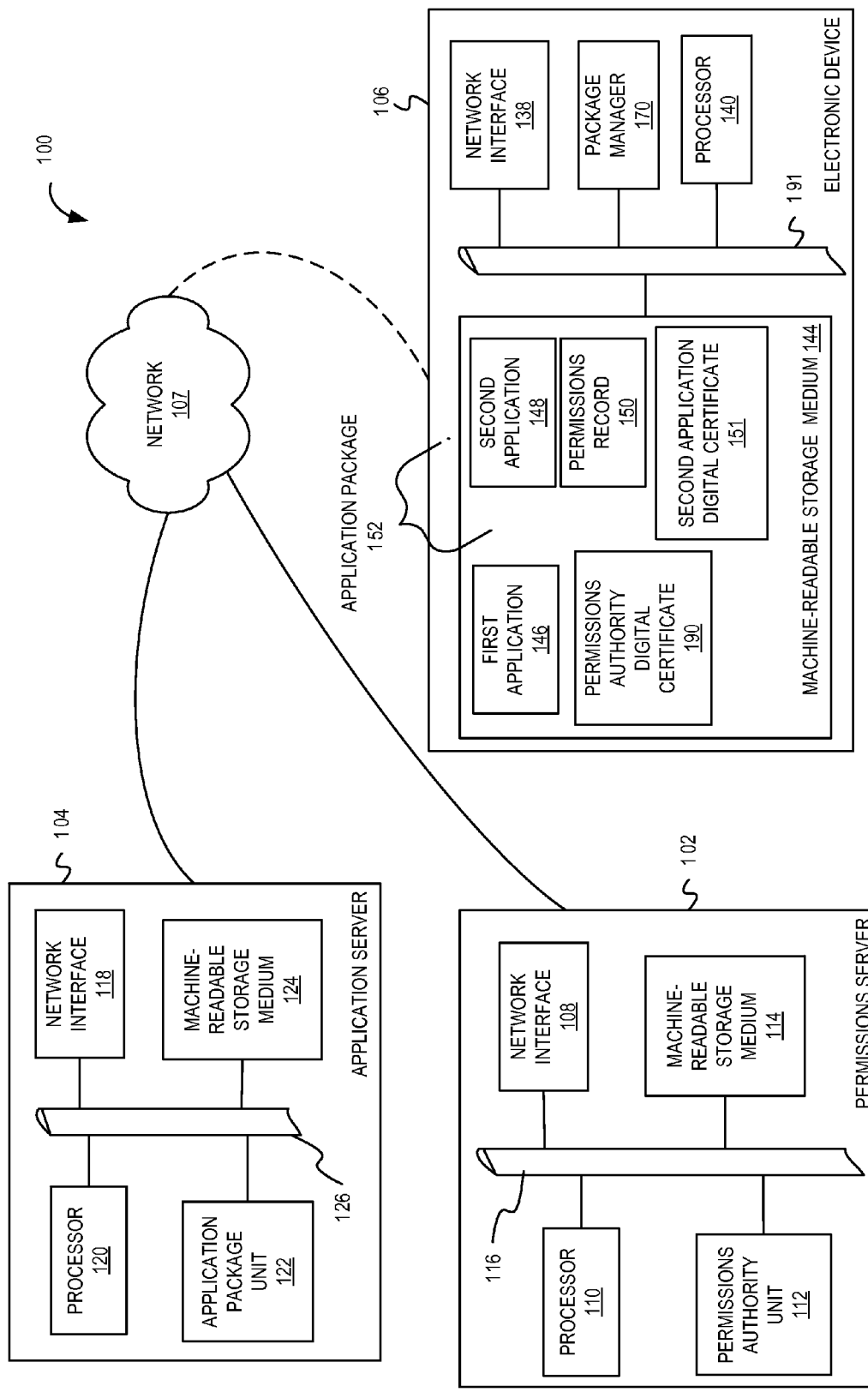
FIG. 4 depicts the example system for authorizing of an intra-application permission on a device at a third point in time, according to some embodiments.

FIG. 4 depicts the example system for authorizing of an intra-application permission on a device at a third point in time, according to some embodiments. In particular, FIG. 4 depicts the system 100 of FIG. 2 after the permissions listed in the permissions record 150 have been authorized and the second application 148 is now considered an installed application 448. In this current example depicted in FIG. 4, only one installed application (the first application 146) authorizes a permission to access its data. However as described above, the permissions record can include any number of permissions that include permissions to access data from one or more installed applications. Accordingly, the installed application 448 can be executed in the electronic device 106.

FIG. 5 depicts an example permissions record that includes a list of permissions needed to access protected data in a first application on a device, according to some embodiments. The permissions record 500 includes a list of permissions that include one to any number of permissions. The permissions record 500 can represent an example of the permissions record 150 that is associated with the second application 148 depicted in FIGS. 1-2. The list of permissions includes a permission 502, a permission 504, and a permission 506. The permission 502 indicates that a permission is needed to access data X from an installed application A (e.g., the first application 146) by the second application 148. The permission 504 indicates that a permission is needed to access data Y from an installed application B. The permission 506 indicates that a permission is needed to access data Z from an installed application N. Accordingly, a permission can be some subset of data being protected by the installed application. Thus, an installed application can make some data accessible to the second application without making all protected data available to the second application.

The permissions record 500 may include a digital certificate of the candidate application 508. In particular, the digital certificate of the candidate application 508 is a digital certificate used to authenticate the candidate application for which the permissions record 500 is associated. As described in more detail below, the installed applications use the digital certificate of the candidate application 508 to authorize the permissions in the permissions record 500. The permissions record 500 also includes a permissions authority digital signature 510. The installed applications use the permission authority digital signature 510 to validate the permissions in the permissions record 500. In particular, the permissions authority digital signature 510 can be used to verify that the permissions record 500 was authenticated by a permissions authority that determines which permissions are authorized between applications on electronic devices. A more detailed description of these operations are now described.

FIGS. 6-7 depict flowcharts of operations to authorize an intra-application permission on a device, according to some embodiments. FIG. 6 depicts a flowchart 600, and FIG. 7 depicts a flowchart 700. The flowchart 700 includes operations that continue from the operations depicted in the flowchart 600 at transition points A and B. The operations depicted in the flowchart 600 and the flowchart 700 are described in reference to the system 100 depicted in FIGS. 1-2. With referring to the system 100 in FIGS. 1-2 as an example, the first application (referenced in FIGS. 6-7) is the first application 146, and the second application (referenced in FIG. 6-7) is the second application 148. Operations of the flowchart 600 start at block 604.

At block 604, a permissions request may be received by a first application from a second application to access data (controlled by or associated with the first application) by the second application. The permissions request can be received at runtime after the first application and second application are installed. For example, the permissions request can be received if the second application 148 is already installed and is being upgraded to include one or more new permissions. In a different example, the permissions request can be received in response to initiation of installation of the second application (a candidate application) on a device. With reference to FIG. 1, the application package 152 (that includes the second application 148 and the permissions record 150) are downloaded from the application server 104 into the machine-readable storage medium 144 of the electronic device 106. With reference to FIG. 2, the second application 148 can access the permission record 150 that lists the permissions needed to be authorized in order for the second application 148. In this example, the second application 148 determines there is one permission that needs to be authorized. The permission needs to be authorized by the first application 146. The second application 148 transmits a permissions request 202 to the first application 146. Operations of the flowchart 600 continue at block 606.

At block 606, the permissions record for the second application is accessed by the first application. With reference to FIG. 2, the first application 146 accesses the permissions record 150 for the second application 148. The first application 146 can obtain the permissions record 150 from the second application 148. Alternatively, the first application 146 can retrieve the permissions record 150 that is still within the application package 152 stored in the machine-readable storage medium 144. Accordingly, the first application 146 can access the application package 152 for the second application 148 at runtime when the second application 148 attempts to access data from the first application 146. Operations of the flowchart 600 continue at block 608.

At block 608, the permissions record can be verified, by the first application, that the permissions record was digitally signed by a recognized permissions authority. With reference to FIG. 2, the first application 146 verifies that the permissions record 150 was digitally signed by the permissions authority unit 112. For example, a permissions authority digital signature created by the permissions authority unit 112 can be appended to the permissions record 150. As described above, the permissions authority unit 112 can be a centralized entity that can determine which permissions should be authorized between different applications executing on electronic devices. In addition to creating a permissions record for an application, the permissions authority unit 112 can digitally sign the permissions record to authenticate the permissions record. A copy of the permissions authority digital certificate 190 can be stored in the machine-readable storage medium 144 or memory of the electronic device 106. In some embodiments, the permissions authority digital certificate 190 can be downloaded from the permissions server 102. The permissions authority digital certificate 190 can include a public signing key that is used to verify the permissions authority digital signature that is appended to the permissions record 150. Accordingly, the first application 146 can use the public signing key in the permissions authority digital certificate 190 to verify a digital signature over the permissions record 150. Operations of the flowchart 600 continue at block 610.

At block 610, a determination is made of whether the permissions record was correctly digitally signed by a recognized permissions authority. With reference to FIG. 2, the first application 146 can make this determination based on the successful verification of the digital signatures over the permissions record 150 (as described above). In particular, if the digital signature can be successfully verified by the first application 146 using the public signing key of the permissions authority in the permissions authority digital certificate. If the permissions record 150 has been digitally signed by the permissions authority, operations of the flowchart 600 continue at transition point A. Otherwise, operations of the flowchart 600 continue at transition point B.

From transition point A of FIG. 6 to transition point A of FIG. 7, operations of the flowchart 700 start at block 612.

At block 612, a digital certificate for the second application is accessed by the first application from the package manager. With reference to FIG. 2, the first application 146 accesses the second application digital certificate 151 for the second application 148 from the package manager 170. In particular, the package manager 170 can include copies of the digital certificates for the different applications that are downloaded into the electronic device 106. As described above, the second application digital certificate 151 can be used to digitally sign the second application 148 to authenticate the second application 148. Operations of the flowchart 700 continue at block 614.

At block 614, the digital certificate that is within the permissions record is retrieved by the first application. With reference to FIG. 2, the first application 146 can retrieve the second application digital certificate for the candidate application from the permissions record 150. Operations of the flowchart 700 continue at block 616.

At block 616, a determination is made of whether the digital certificate in the permissions record matches the digital certificate provided by the package manager. In some embodiments, the first application 146 can determine if the two second application digital certificates match by performing a bit-wise comparison of the bits of the two second application digital certificates. With reference to FIG. 2, the first application 146 determines if the second application digital certificate 151 used to authenticate the second application 148 (provided by the package manager 170) matches the second application digital certificate stored in the permissions record 150. If the two second application digital certificates match, operations of the flowchart 700 continue at block 618. Otherwise, operations of the flowchart 700 continue at block 620.

At block 618, permission for the second application is authorized to access the data that is associated with or controlled by the first application. With reference to FIG. 2, if the permissions listed in the permissions record 150 are authorized, the second application 148 is then permitted to access data that is controlled by the first application 146 on the electronic device 106 (shown as the installed application 348 in FIG. 3). Thus, similar operations (described in FIGS. 6-7) can be performed for each of the installed applications identified in the permissions record 150. Operations of the flowchart 700 are complete along this branch of the flowchart 700.

At block 620, permission for the second application is denied access to the data that is associated with or controlled by the first application. With reference to FIG. 2, the first application 146 denies access by the second application 148 to access data that is controlled by the first application 146.

Also, from transition point B of FIG. 6 to transition point B of FIG. 7, operations of the flowchart 700 start at block 620. Accordingly, the permission for the second application can be denied if the digital signature appended to the permissions record is not authenticated or the digital certificate in the permissions record does not match the digital certificate used to authenticate the second application provided by the package manager. Operations of the flowchart 700 are complete along this branch of the flowchart 700.

While described such that verification of the digital signature of the permissions authority (block 608) occurs prior to determination of whether the two copies of the digital certificates for the second application match (blocks 612-616), in some embodiments, the order of these operations can be switched. Thus, the determination of whether the two copies of the digital certificates for the second application match can occur prior to the verification of the digital signature of the permissions authority.

Therefore as described, the permissions authority signing key in the permission authority digital certificate that is used to sign the permissions record can be different from the signing key in the digital certificate for the second application that is stored in the permissions record for verifying permission by the first application. Also, the signing key for the first application and the signing key for the second application can be different. Therefore, while allowing the first application and the second application to be signed with different signing keys, some embodiments can still restrict the sharing of permissions to a subset of applications that are executing on the electronic device. Additionally as described, the permission authorization can be without displaying a request for authorization to a user of the device.

It is noted that the first application and second application described above may be created by different entities. For example, the first application may be provided by a first company and the second application may be provided by a second company. The first and second applications do not need to be associated with a common application provider certificate and can be installed separately using the application installer of the electronic device. Using the permissions record provided by the permissions server and stored in the application package, a second application can be granted access to part or all of the data maintained by the first application. Therefore, intra-application permissions can be granted despite limitations of the application installer, and regardless of whether the applications are associated with a common application provider certificate.

In some embodiments, an application can be digitally signed more than once. For example, the application can be digitally signed using multiple, different private keys associated with multiple different digital certificates. Accordingly for the examples described herein, the second application can have multiple digital certificates. Thus, the permissions record for the second application can store more than one digital certificate for the second application. In turn, the operations by the first application to verify that the second application has permission to access its data can be modified such that the first application can verify one, a subset, or all of the digital certificates associated with the second application that is stored in the permissions record.

The example sequence of operations described above are but one possible example of many possible sequences. Many other sequences are possible, with different operations and different ordering of operations. The embodiments are not limited to any particular ordering of operations.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
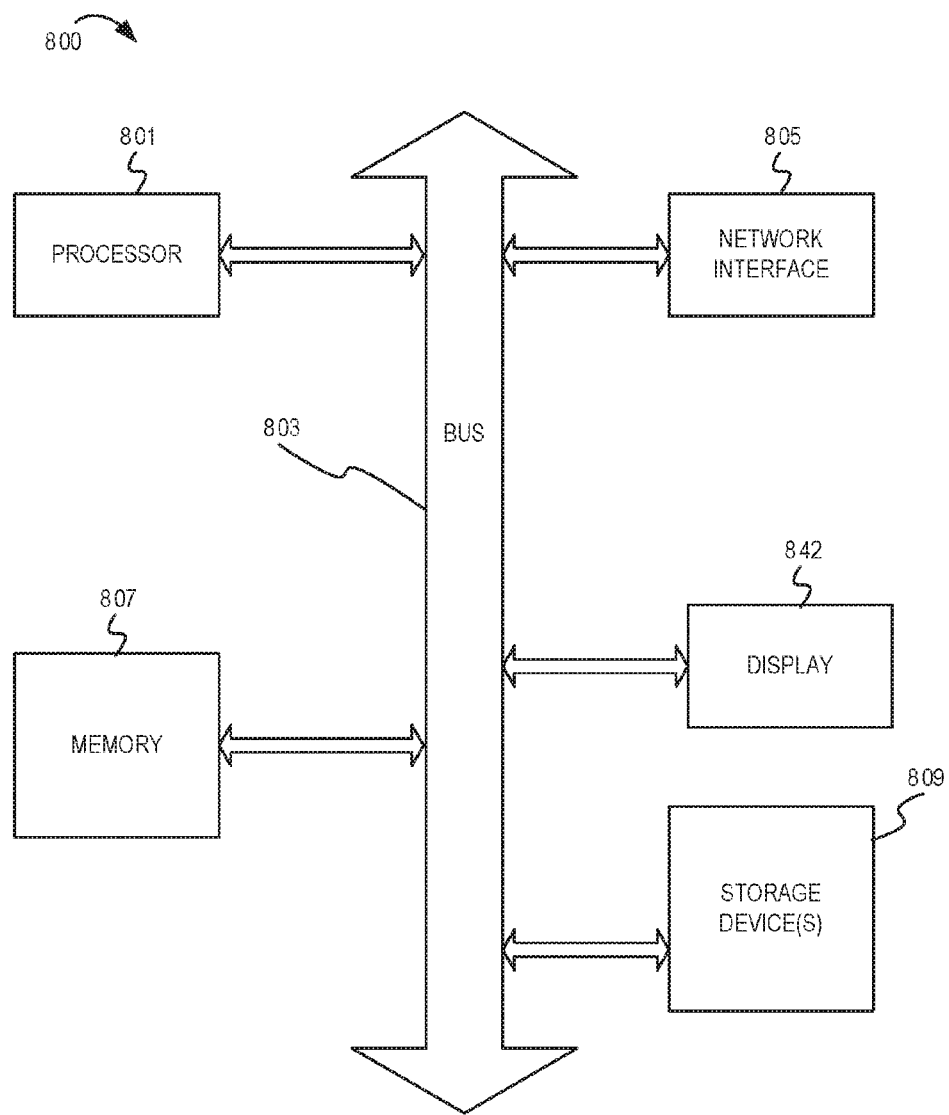
FIG. 8 depicts an example electronic device, according to some embodiments.

FIG. 8 depicts an example electronic device, according to some embodiments. FIG. 8 depicts an electronic device 800 that can be an example of the electronic device 106 depicted in FIGS. 1-2. The electronic device 800 includes a processor 801 (possibly including multiple processors, multiple cores, multiple nodes, and/or implementing multi-threading, etc.). The electronic device 800 includes a memory 807. The memory 807 can represent the machine-readable storage medium 144 depicted in FIGS. 1-2. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport®, Infini-Band®, NuBus, etc.), a network interface 805 (e.g., an ATM interface, an Ethernet interface, a Frame Relay interface, SONET interface, wireless interface, etc.), and storage device(s) 809 (e.g., optical storage, magnetic storage, etc.). The computer system includes a display 842. Some or all of the operations described herein may be implemented with code embodied in the memory and/or processor, co-processors, other cards, etc. Any one of these operations may be partially (or entirely) implemented in hardware and/or on the processor 801. For example, the operations may be implemented with an application specific integrated circuit, in logic implemented in the processor 801, in a co-processor on a peripheral device or card, etc.

Further, realizations may include fewer or additional components not illustrated in FIG. 8 (e.g., video cards, audio cards, additional network interfaces, peripheral devices, etc.). The processor 801, the storage device(s) 809, the network interface 805, the memory 807, and the display 842 are coupled to the bus 803. Although illustrated as being coupled to the bus 803, the memory 807 may be coupled to the processor 801.

While the embodiments are described with reference to various implementations and exploitations, it will be understood that these embodiments are illustrative and that the scope of the subject matter is not limited to them. In general, techniques for intra-application permissions on electronic devices as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the subject matter.

What is claimed is:

1. A method comprising:
   receiving, by a first application that is installed on a device, a request from a second application for permission to access data associated with the first application;
   accessing a permissions record for the second application, wherein the permissions record comprises an identification of the first application from which a permission is needed and a first digital certificate used to verify authenticity of the second application;
   verifying that the permissions record is signed by an authorized permissions authority unit configured to validate contents of the permissions record; and
   verifying that the second application has permission to access the data associated with the first application based, at least in part, on the permissions record in response to verifying that the permissions record is signed by the authorized permissions authority unit.

2. The method of claim 1, wherein the permissions record for the second application is stored in an application package for the second application, the application package comprising an installation file associated with the second application, wherein the installation file is stored by an application installer of the device.

3. The method of claim 1, wherein the permissions record for the second application is stored in an application package for the second application, wherein said accessing the permissions record comprises requesting the permissions record using a file system path associated with the application package.

4. The method of claim 1, wherein the verifying comprises verifying that the second application has permission to access the data associated with the first application based, at least in part, on the first digital certificate used to verify authenticity of the second application that is stored in the permissions record.

5. The method of claim 4, wherein the receiving of the request occurs after the second application is installed on the device.

6. The method of claim 4, wherein the permissions record for the second application is stored in an application package for the second application, further comprising:
   retrieving a copy of the first digital certificate that is used to authenticate the application package that includes the second application, wherein the retrieving is from a source that is different from the permissions record, and wherein the verifying comprises,
      verifying that the copy of the first digital certificate matches the first digital certificate stored in the permissions record.

7. The method of claim 1, wherein the verifying that the second application has permission to access the data associated with the first application comprises verifying without displaying a request for authorization to a user of the device.

8. The method of claim 1, wherein a first application signing key for validating the first application is different from a second application signing key for validating the second application.

9. An apparatus comprising:
   a processor; and
   a first application installed on the apparatus and executable on the processor, the first application configured to:
      receive a request from a second application for permission to access data associated with the first application;
      access a permissions record for the second application, wherein the permissions record comprises an identification of the first application from which a permission is needed and a first digital certificate used to verify authenticity of the second application;
      verify that the permissions record is signed by an authorized permissions authority unit configured to validate the contents of the permissions record; and
      verify that the second application has permission to access the data associated with the first application based, at least in part, on the permissions record in response to verifying whether the permissions record is signed by the authorized permissions authority unit.

10. The apparatus of claim 9,
wherein the permissions record for the second application is stored in an application package for the second application,
wherein the application package comprises an installation file associated with the second application, wherein the installation file is stored by an application installer of the apparatus, and
wherein the first application configured to access the permissions record comprises the first application configured to request the permissions record associated with the application package.

11. The apparatus of claim 9, wherein the first application configured to verify comprises the first application configured to verify that the second application has permission to access the data associated with the first application based, at least in part, on the first digital certificate used to verify authenticity of the second application that is stored in the permissions record.

12. The apparatus of claim 11, wherein the first application is configured to receive the request after the second application is installed on the apparatus.

13. The apparatus of claim 11,
wherein the first application is configured to retrieve a copy of the first digital certificate that is used to authenticate an application package that includes the second application, wherein the copy of the first digital certificate is from a source that is different from the permissions record, and
wherein the first application configured to verify comprises the first application configured to:
verify that the copy of the first digital certificate matches the first digital certificate stored in the permissions record.

14. The apparatus of claim 9, wherein the first application configured to verify that the second application has permission to access the data associated with the first application comprises the first application configured to verify without display of a request for authorization to a user of the apparatus.

15. The apparatus of claim 9, wherein a first application signing key for validation of the first application is different from a second application signing key for validation of the second application.

16. A non-transitory computer readable storage medium having computer usable program code embodied therewith, the computer usable program code comprising a computer usable program code that is part of a first application installed on a device, the computer usable program code configured to:
receive a request from a second application for a permission to access data associated with the first application;
access a permissions record for the second application, wherein the permissions record comprises an identification of the first application from which the permission is needed and a first digital certificate used to verify authenticity of the second application;
verify that the permissions record is signed by an authorized permissions authority unit configured to validate the contents of the permissions record, and
verify that the second application has permission to access the data associated with the first application based, at least in part, on the permissions record in response to verifying that the permissions record is signed by the authorized permissions authority unit.

17. The non-transitory computer readable storage medium of claim 16, wherein the computer usable program code configured to verify comprises computer usable program code configured to verify that the second application has permission to access the data associated with the first application based, at least in part, on the first digital certificate used to verify authenticity of the second application that is stored in the permissions record.

18. The non-transitory computer readable storage medium of claim 17, wherein the computer usable program code is configured to receive the request after the second application is installed on the device.

19. The non-transitory computer readable storage medium of claim 17,
wherein the computer usable program code is configured to retrieve a copy of the first digital certificate that is used to authenticate an application package that includes the second application, wherein the copy of the first digital certificate is from a source that is different from the permissions record, and
wherein the computer usable program code configured to verify comprises computer usable program code configured to:
verify that the copy of the first digital certificate matches the first digital certificate stored in the permissions record.

* * * * *